(12) United States Patent
Gau

(10) Patent No.: US 8,454,791 B2  
(45) Date of Patent: Jun. 4, 2013

(54) METHOD FOR ASSEMBLING A ROTOR BLADE FOR A WIND TURBINE

(75) Inventor: Lutz-Reiner Gau, Postdam (DE)

(73) Assignee: Nordex Energy GmbH, Norderstedt (DE)

( * ) Notice: Subject to any disclaimer, the term of this patent is extended or adjusted under 35 U.S.C. 154(b) by 275 days.

(21) Appl. No.: 12/788,932

(22) Filed: May 27, 2010

(65) Prior Publication Data

US 2011/0126978 A1 Jun. 2, 2011

(30) Foreign Application Priority Data

May 29, 2009 (DE) .......................... 10 2009 024 324

(51) Int. Cl.
   *B32B 37/00* (2006.01)
   *B29C 65/00* (2006.01)
(52) U.S. Cl.
   USPC ........................ 156/297; 156/228; 416/229 R

(58) Field of Classification Search
   USPC ................. 156/228, 245, 297, 305, 539, 556, 156/581; 416/233, 226, 229 R
   See application file for complete search history.

(56) References Cited

U.S. PATENT DOCUMENTS

| | | | | |
|---|---|---|---|---|
| 1,765,023 A | * | 6/1930 | McWane | 294/81.52 |
| 3,154,338 A | * | 10/1964 | Leach | 294/192 |
| 4,736,976 A | * | 4/1988 | Berzenye | 294/82.1 |
| 2005/0063812 A1 | * | 3/2005 | Bos | 414/626 |
| 2008/0069699 A1 | * | 3/2008 | Bech | 416/229 R |

FOREIGN PATENT DOCUMENTS

EP 433513 A1 * 6/1991

OTHER PUBLICATIONS

Machine translation of EP 433513 date unknown.*

* cited by examiner

*Primary Examiner* — John Goff
(74) *Attorney, Agent, or Firm* — Vidas, Arrett & Steinkraus, P.A.

(57) ABSTRACT

Method for assembling a rotor blade for a wind turbine, wherein the rotor blade has a first half shell, a second half shell and at least one shear web running in the longitudinal direction of the rotor blade.

9 Claims, 3 Drawing Sheets

METHOD FOR ASSEMBLING A ROTOR BLADE FOR A WIND TURBINE

CROSS-REFERENCE TO RELATED APPLICATIONS

Figure 1:
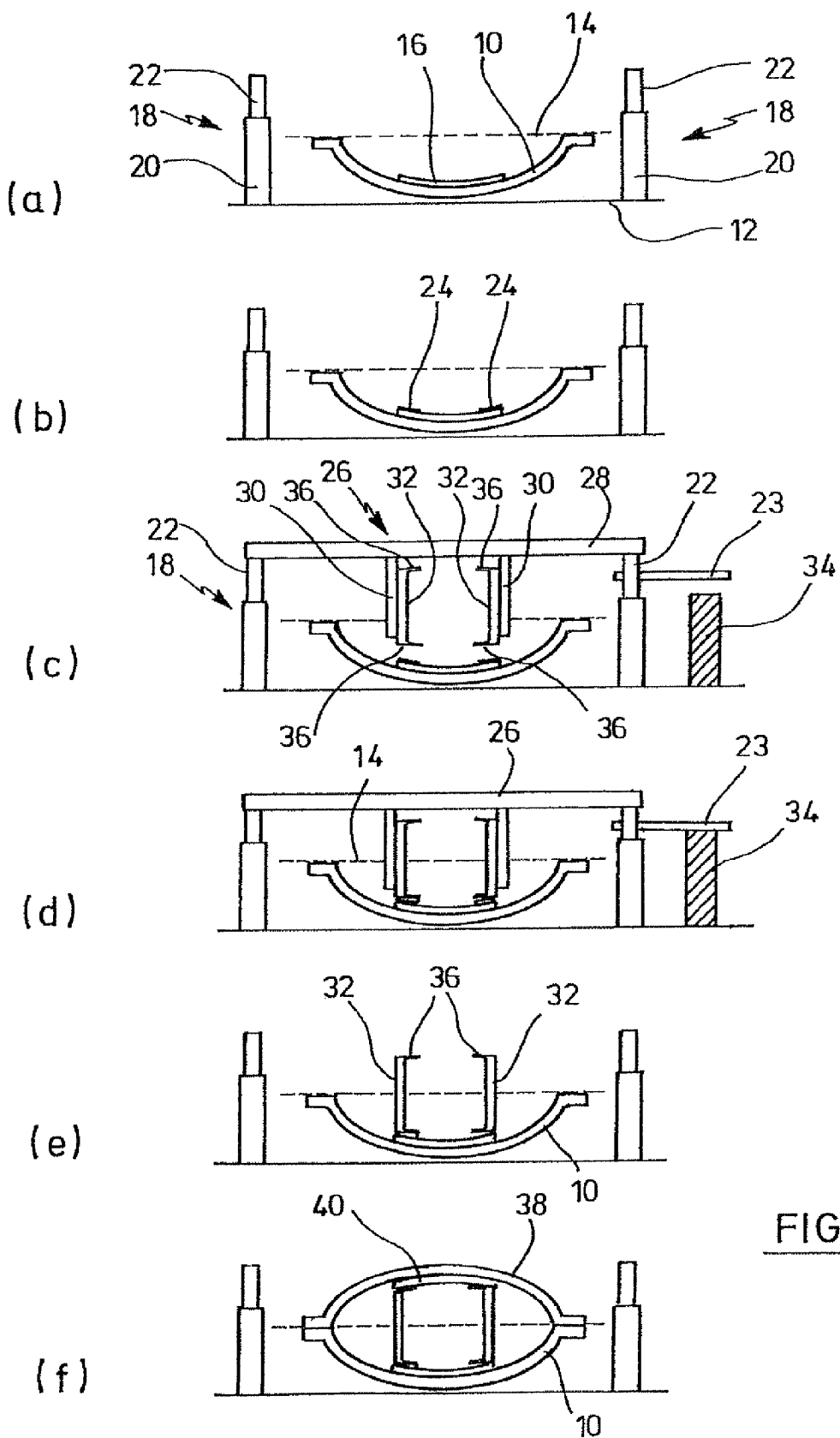

Not applicable.

STATEMENT REGARDING FEDERALLY SPONSORED RESEARCH

Not applicable.

BACKGROUND OF THE INVENTION

The invention relates to a method and an apparatus for assembling a rotor blade for a wind turbine, which has a first half shell, a second half shell and at least one shear web running in the longitudinal direction of the rotor blade.

Rotor blades of wind turbines are exposed to high and changing loads. The rigidity and aerodynamic quality of the rotor blades particularly depends on the exact and secure assembling of the named components, especially in the case of rotor blades joined together from two half shells. The upper and lower shells of such rotor blades usually consist of glass fibre reinforced plastic and are glued together circumferentially on their leading and trailing edges. A shear web or even several shear webs arranged in particular in a parallel manner, which are connected with the lower shell and the upper shell and give the rotor blade additional rigidity, are frequently located between the upper and lower shell. The shear web(s) form a structural unit with the main girders running along the shell halves.

In the case of a known assembly procedure, the lower shell of the rotor blade is first arranged in a mold that is open on the top or on a suitable frame so that its inner surface points up. Adhesive is applied to the lower shell in the connection area between the lower shell and the shear web(s). The shear web(s) are then lowered to the desired position onto the lower shell using a hoisting device until they rest on the lower shell. Adhesive is then applied in the connection area between the shell halves and in the connection area between the shear web(s) and the upper shell and the upper shell is fitted on the shear web(s) and the lower shell and glued to it.

BRIEF SUMMARY OF THE INVENTION

Based on this, the object of the invention is to provide an improved method for assembling a rotor blade for a wind turbine, which allows an even and accurate dimension of the glued connections of shear web(s) with the main girders integrated into the main shell with at the same time low adhesive consumption, as well as an apparatus for the implementation of the method.

The invention is based on the knowledge that the lowering of the shear web known from the state of the art onto the lower shell often leads to an inaccurate positioning of the shear web. This is caused by dimensional deviations in the inner contour of the lower shell. The half shells of the rotor blades are generally produced in open molds either by inserting glass plies already saturated with resin, so-called prepregs, or through a dry layer layup made of glass plies with subsequent infusion or injection of a resin. The layer layup is covered in an airtight manner with a plastic film and the air is evacuated. The atmospheric air pressure, which is now greater than the internal pressure under the plastic film presses the glass ply layers together and thus guarantees a high density of the created laminate. Caused by different pressure and temperature conditions, ondulations and waves in the plies and differing viscosities and wetting behaviors of the glass fibers depending on the temperature and chemical composition of the resins, irregularities in the inner contours of the half shells occur in the form of ondulations, waves and bulges. Ondulations should be understood as rises in the longitudinal direction of the half shell. Wave-like rises extend in the transverse direction of the half shells.

In the assembly method known from the state of the art, the shear web under its own weight sinks to different depths in the applied adhesive depending on the viscosity of the adhesive. In the case of a relatively fluid adhesive, the shear web generally sinks down to the inner contour of the rotor blade. The irregularities frequently occurring in the inner counter in the form of waves or ondulations in the laminate lead to a punctiform seating of the shear web. Irregularities, where the heights go beyond the permissible clearance, have a particularly negative effect on the vertical position of the shear web. The shear web can also tilt in the longitudinal and/or transverse direction, which leads to errors in the positioning of the shear web and as a result to large deviations in the thickness and geometry of the glue gap. In the case of greater irregularities in the inner contour of the half shell, it can also happen that the shear web does not have sufficient contact with the applied adhesive in some places and the remaining free space between the shear web and the half shell is not sufficiently filled with adhesive. In extreme cases, the fitting and gluing of the upper shell with the lower shell and the shear web(s) may become impossible due to high-standing shear-web areas. The shear webs must then be cut in their longitudinal direction in a centered manner in order to reduce their height.

Deviations in the position of the shear web on the lower shell can lead to considerable inaccuracies in the connection with the upper shell. The named problems require costly rework of the adhesive connections of the respective rotor blade, which is no longer possible after the fitting of the upper shell under certain circumstances. In particular in the flatter rotor blade areas near the blade tip, the inspection or rework of the adhesive connections after gluing of the blade is only possible to a limited extent.

The method for assembling a rotor blade for a wind turbine, which has a first half shell, a second half shell and at least one shear web running in the longitudinal direction of the rotor blade, comprising the following steps:

Arranging the first half shell in a specified position,

Fastening the at least one shear web on a shear web setting device,

Applying adhesive in the connection area between the first half shell and the at least one shear web, Moving the shear web setting device with the at least one shear web fastened to it in the direction of the first half shell up to an end position, in which the adhesive cures and connects the at least one shear web and the first half shell together, wherein at least one movement restriction device restricting the movement towards the first half shell specifies the end position such that the at least one shear web is arranged floating along its entire length at a distance from the first half shell, Loosening and removing the shear web setting device from the at least one shear web, Applying adhesive in the connection area between the second half shell and the at least one shear web, Arranging the second half shell in a specified position and connecting the first half shell to the second half shell.

The first half shell can be the lower shell and the second half shell can be the upper shell of the rotor blade or vice versa. The arrangement of the first half shell can take place for example with the help of a mold used to manufacture the half shell or another carrying or holding device, hereinafter referred to as the reception device, which receives the first half shell in a specified position and holds it in this position. In particular, the first half shell can be arranged such that its interior points upwards.

The fastening of the at least one shear web on the shear web setting device can take place in particular with the help of a suitable fastening device of the shear web setting device, with which the at least one shear web can be fastened in the shear web setting device. The fastening can take place such that the at least one shear web is fixed in a specified linear and angular position with respect to the shear web setting device.

The adhesive is applied in the connection area between the first half shell and the at least one shear web. It can for example be applied to the interior of the first half shell. The adhesive in the connection area between the second half shell and the at least one shear web can be applied for example to the surface of the at least one shear web facing the second half shell or to the inside of the second half shell.

Arranging of the second half shell in a specified position can take place for example with the help of a crane; it is also conceivable to use a separate device, with which the second half shell is brought into the specified position, for example through the pivoting of the second half shell around an axis of rotation running parallel to its longitudinal direction. In order to bring the second half shell into its set position, it can be pushed downwards with an additional force, for example by a positioning device for the second half shell or a mold closing device. The movement of the second half shell downwards can preferably take place down to an end position settable by at least one additional strike. In particular in the case of adhesive with a relatively high viscosity, when the weight of the second half shell is not sufficient for sinking into the adhesive down to the set position of the second half shell under certain circumstances, it can thereby be guaranteed that the second half shell makes it to its set position and is connected with the first half shell in it. The connection of the two half shells can take place in particular through gluing along the leading and trailing edges of the two half shells.

In the case of the invention, the movement of the shear web setting device with the at least one shear web fastened to it takes place in the direction to the first half shell up to the end position. This end position is given by a movement restriction device, which restricts the movement, in such a way that in the end position the at least one shear web is arranged along its entire length at a distance from the first half shell. It is thereby avoided that the shear web touches first half, in particular in the area of the waves or ondulations of the inner contour of the first half shell. Thus, a defined glue gap with a certain minimum height is also achieved in these areas. The end position can be determined for example with respect to a center or symmetry axis of the rotor blade such that the at least one shear web is held "floating" at a distance from the first half shell and is held in its set position both with respect to the first and the second half shell.

The movement restriction device can for example be a mechanical stop, but can also be a restriction in the movement with the help of a controller, which stops the movement when a settable end position has been reached, for example through activation of an adjustment device executing the movement. In this case, the movement restriction device can define a set value for the adjustment device, which defines the end position. The at least one movement restriction device is preferably adjustable. For example, a stop serving as a movement restriction device and/or a counter piece working together with the stop, such as a defined contact surface, can be adjustable so that the end position of the shear web can be adjusted according to its set position.

After the curing of the adhesive in the connection area between the first half shell and the at least one shear web, the shear web is thus located exactly in this position such that the desired distance is also held exactly between the at least one shear web and the second half shell. The loosening and removing of the shear web setting device preferably takes place after the complete curing of the adhesive.

In one embodiment, the at least one movement restriction device is designed as a stop on the shear web setting device and works together with the shell edge of the first half shell and/or with a reception device for the first half shell holding the first half shell in its specified position. In general, the stop can be designed in any manner as long as it restricts the movement of the shear web. For example, at least one stop can be designed on the at least one shear web or on the first half shell, which restricts the relative movement between the shear web and the half shell in the end position in that it touches the respective other component. However, at least one stop is preferably designed such that it becomes operative regardless of the production tolerances of the inner contour of the first half shell. For this, for example, at least one stop becoming operative regardless of the presence of the first half shell and/or the presence of the least one shear web can be used, which restricts the movement of a first component of the device with respect to a second component of the device. This is for example the case when the at least one stop is arranged on the shear web setting device and works together with a reception device for the first half shell. For this, the reception device can have defined contact areas, which touch the stops of the shear web setting device. Alternatively, a contact can also be provided between stops arranged on the shear web setting device and the first half shell itself. For this, an area of the first half shell, which has relatively low production tolerances, is preferably selected as the contact surface for the stops, in particular suitable shell edge sections of the first half shell. The interaction of stop permanently arranged with respect to the shear web setting device with any permanent counter piece is also possible.

In one embodiment, the shear web setting device with the at least one shear web fastened to it is arranged before the movement to the end position in a specified position at a distance from the first half shell and the movement of the shear web setting device is designed such that the movement direction and the relative angular position of the at least one shear web is given with respect to the first half shell. The specified position can lie next to or above the first half shell. However, other specified positions are also possible. In this embodiment, the at least one shear web is located in a well defined position and angularity during the movement. A tipping or sliding of the at least one shear web with respect to the first half shell is thereby excluded during the movement and in the end position. A considerably more exact positioning of the at least one shear web with respect to the half shell is thereby made possible and the end position is achieved in a particularly reliable manner.

The guiding of the movement in a specified direction can be designed in particular such that a return movement in the opposite direction is not possible. Otherwise, the removal of the shear web from the first half shell can easily lead to an impairment of the glued connection. This problem frequently occurs in the method known from the state of the art when a positioning error of the shear web is detected and an attempt is made to still correct the position. If a return movement of the shear web is excluded by the invention, this problem can no longer occur when a return movement of the shear web was not intended.

In one embodiment, for assembling a rotor blade, which has several shear webs running in the longitudinal direction, all or individual shear webs are fastened on the shear web setting device, wherein the fastening permanently predetermines the position of each shear web with respect to the shear web setting device and with respect to the half shells. For example, the rotor blade can have two, three or more shear webs. The shear webs can also be connected with each other. By the defined fastening of all shear webs on the shear web setting device, the advantages already explained are also achieved for each individual shear web when simultaneously using several shear webs.

In one embodiment, the fastening of the at least one shear web on the shear web setting device takes place with a plurality of load-bearing means on the shear web setting device, which work together with the load-bearing points on the at least one shear web such that a specified positioning of the at least one shear web with respect to the shear web setting device is achieved. The load-bearing means can be for example screws or bolts, which work together with bore holes or other openings as load-bearing points on the shear web setting device. Through the targeted interaction of load-bearing means and load-bearing points, it is achieved that the at least one shear web is automatically located in its desired position with respect to the shear web setting device after fastening on the shear web setting device. In accordance with one embodiment, the load-bearing means each have a cone, which works together with a conical opening on one of the load-bearing points or vice versa. Through the interaction of the conical surfaces, an automatic centering is achieved, which leads to a particularly exact positioning of the at least one shear web with respect to the shear web setting device. The load-bearing means can also have collets formed in any practical manner, which work together with correspondingly designed openings on the load-bearing points.

In one embodiment, the movement of the shear web setting device with the at least one shear web fastened to it in the direction of the first half shell takes place with the help of lowering devices, which lower the shear web setting device relative to the first half shell. The lowering devices can be for example hydraulic cylinders, pneumatically operated cylinders or electrically/mechanically driven adjusting devices. When using hydraulic or pneumatic cylinders, it can be provided in particular that the lowering takes place through the opening of a valve, whereby the escape of the pressurizing medium from the cylinder is enabled. In this case, an accidental return movement of the shear web setting device with the attached shear web is automatically prevented because a supply of the pressurizing medium to the respective cylinder would be required for this.

In one embodiment, the at least one movement restriction device is designed on the lowering devices such that it restricts an adjustment path of the lowering devices. This movement restriction device is also preferably adjustable such that the end position can be precisely defined by corresponding restriction of the maximum lowering range of the lowering devices.

In accordance with one embodiment, the lowering devices form bearings, onto which the shear web setting device is lowered before the shear web setting device is set down with the help of the lowering devices. In particular, the shear web setting device can have defined counter bearings, which work together with the bearings. After the setting down of the shear web setting device onto the bearings and before the lowering of the lowering devices the at least one shear web fastened to the shear web setting device is located in the specified position at a distanced from the first half shell. The movement is executed by lowering the lowering devices, wherein the lowering devices can at the same time form a guide for the movement, for example by the movement direction defined by the arrangement of a piston of a hydraulic or pneumatic cylinder.

Alternatively, the bearings can also be located on a stationary device. The height of the bearing points then correspond with the specified lowering position of the shear webs. The shear web setting device is lowered by means of a crane or other suitable working means. Alternatively, the shear web setting device can also be lowered onto the bearings by means of a pivoting movement around an axis running in the longitudinal direction of the shear web setting device. A combination of a pivot and translation movement is also conceivable.

According to the invention the apparatus for assembling a rotor blade for a wind turbine, which has a first half shell, a second half shell and at least one shear web running in the longitudinal direction of the rotor blade, comprises a reception device for the first half shell for receiving the first half shell in a specified position, a shear web setting device, which has a fastening device, with which the at least one shear web can be fastened in a releasable manner on the shear web setting device and a movement device for the movement of the shear web setting device with the at least one shear web fastened to it from a specified position in the direction of the reception device for the first half shell up to an end position, wherein the apparatus has at least one movement restriction device, with which the movement towards the end position can be limited and the end position can be defined.

The method according to the invention can be executed with the apparatus. Please refer to the explanation of the corresponding method with respect to the features and the special advantages of the apparatus.

In accordance with one embodiment, the movement device has a guide for defining the movement direction and relative angular position of the shear web setting device with respect to the reception device for the first half shell. The at least one movement restriction device is preferably designed on the guide. The movement restriction device can for example be part of a lowering device, for example in the form of a path restriction of a piston, or a separate mechanical apparatus, which restricts the movement of the shear web setting device. The movement restriction device is preferably operative independent of components of the rotor blade located in the apparatus. It is preferably designed in an adjustable manner such that the end position can be adjusted based on the respective conditions.

BRIEF DESCRIPTION OF EACH OF THE FIGURES OF THE DRAWINGS

Figure 2A:
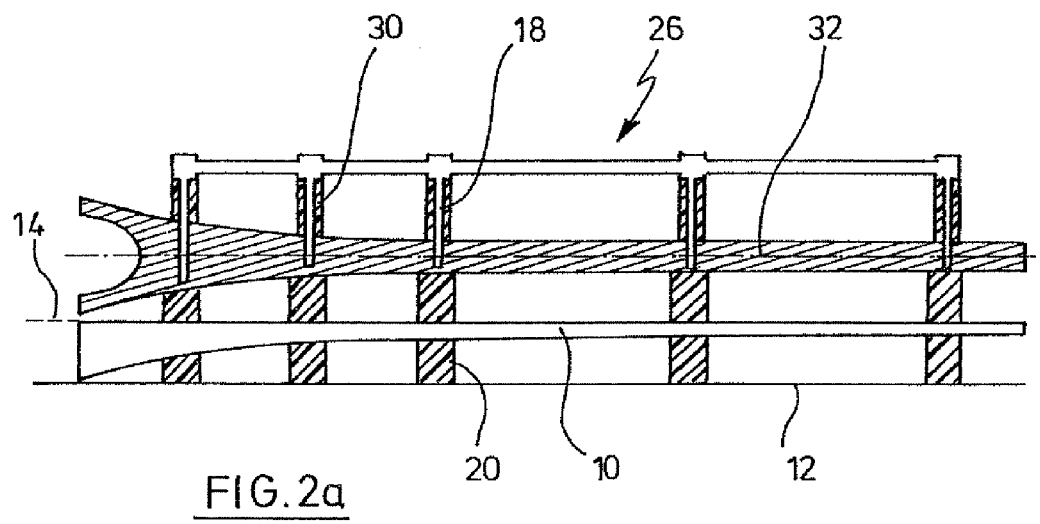
Figure 2B:
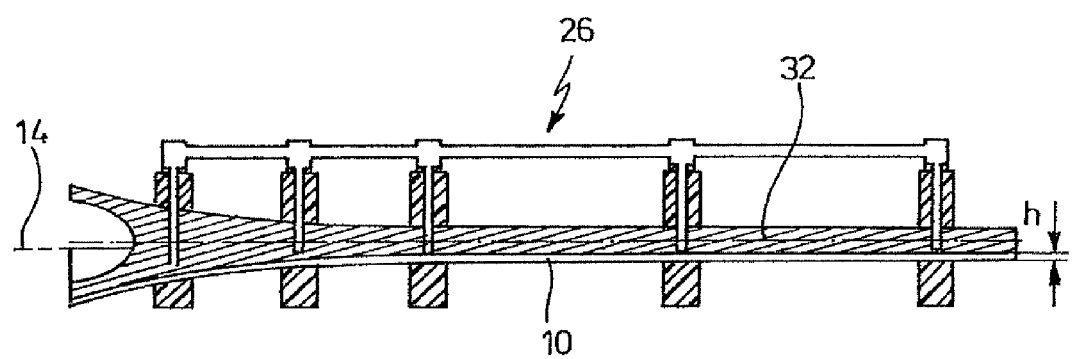
Figure 3A:
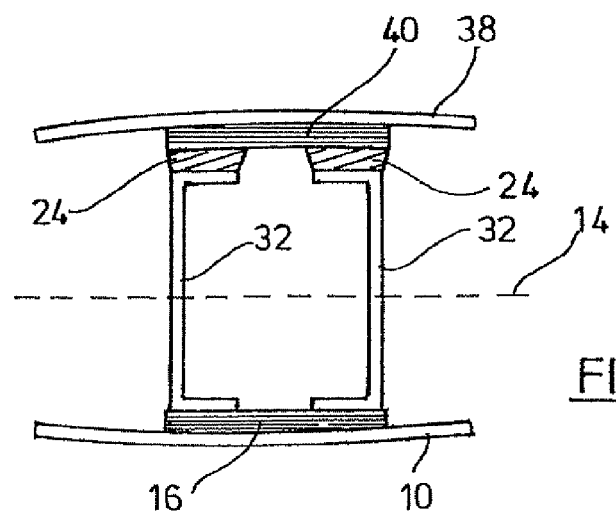
Figure 3B:
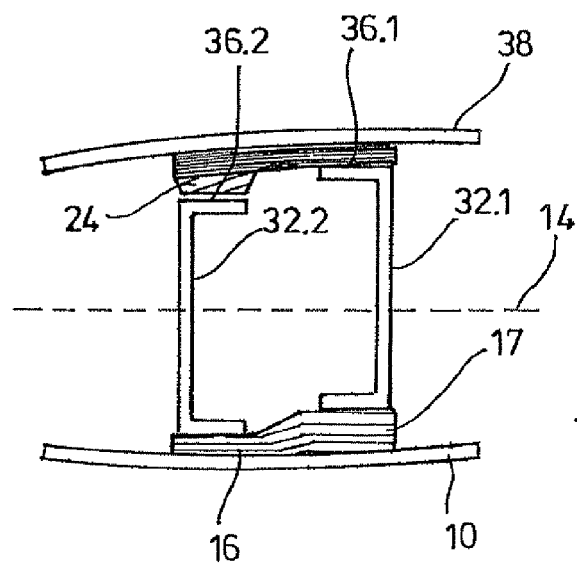
Figure 3C:
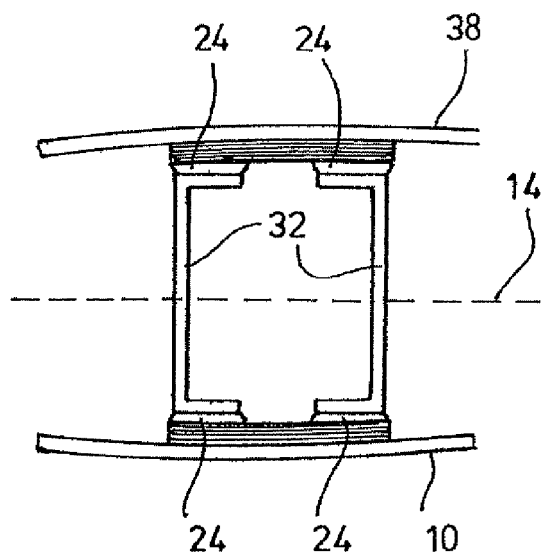

The invention is explained in greater detail below based on exemplary embodiments shown in three figures. The drawings show in:

FIG. 1a-f the method according to the invention with the help of an apparatus according to the invention, wherein the illustration parts a) through f) illustrate the successive method steps, FIG. 2a-b a side view of the apparatus according to the invention, FIG. 3a-c a cross-section through a rotor blade with glued-in shear webs.

DETAILED DESCRIPTION OF THE INVENTION

FIG. 1a) shows a first half shell 10 of a rotor blade, which is arranged in a reception device (not shown) or in the open mold used for manufacturing the half shell. It is located in a defined position above the floor 12 of an assembly hall, with the interior of the first half shell 10 pointing upwards. The dashed lines show a separation plane 14 of the rotor blade, which runs from the leading edge of the rotor blade to the trailing edge of the rotor blade. The first half shell 10 has a main girder 16 on the interior, which reinforces the first half shell. A lowering device 18 consisting of a hydraulic cylinder 20 and a piston 22 is arranged on both sides of the first half shell 10. The lowering devices 18 are fastened on the floor 12 of the assembly hall.

In addition to the already explained elements, adhesive is arranged in the connection area between the first half shell and two shear webs in FIG. 1b) and is applied to the interior of the first half shell 10 or the main girder 16.

FIG. 1c) also shows the shear web setting device 26, which has a cross member 28 and further supports 30 projecting downwards. Two shear webs 32 of the rotor blade are located between the two supports 30. The shear webs 32 have angled fastening sections 36 along their longitudinal edges facing the two half shells, which enable extensive contact with the two half shells in the connection area.

The cross member 28 has a counter bearing (not shown) in the area of both of its ends, which rests on corresponding bearings on the pistons 22 of the two lowering devices 18. The cross member 28 preferably extends horizontally at a right angle to the longitudinal direction of the first half shell 10 or of the two shear webs 32 respectively.

In FIG. 1c), the shear web setting device 26 with the shear webs 32 fastened to it are located in a specified position, wherein a relatively large distance remains between the shear webs 32 and the first half shell 10. Starting from this position, the lowering of the shear web setting device 26 takes place by opening a valve of the hydraulic cylinder 18. The shear web setting device 26 with the shear webs 32 fastened to it moves towards the first half shell 10, due to the guide formed by the lowering devices 18 following a permanently defined movement direction, in the shown example vertically downwards, and adhering to a defined angular position.

The movement takes place until a defined end position, which is shown in FIG. 1d) is reached, through at least one stop 23, which is a movement restriction device. The stop 23 is permanently arranged with respect to the shear web setting device 26 and works together with a counter piece 34 that is permanently fixed on the floor 12. In the end position, the shear webs 32 are located in a position defined with respect to the separation plane 14 and at a distance from the first half shell 10. They are in contact with the adhesive 24 and are arranged floating above the inner contour of the first half shell 10. The defined distance and the exactly adhered to set geometry guarantee a high-strength and adhesive-saving gluing between the shear webs 32 and the first half shell 10 or the main girder 16 respectively.

After the curing of the adhesive, the shear web setting device 26 is loosened and removed from the shear webs 32. This state is illustrated in FIG. 1e). The two shear webs 32 continue to be located in the exact end position reached after the guided movement of the shear web setting device 26 has ended.

In further method steps, adhesive is applied to the upper angled fastening sections 36 of the shear webs 32 and the second half shell 38 is fitted with the help of a suitable apparatus. After the curing of the adhesive, it is permanently connected with the two shear webs 32. A connection between the first half shell 10 and the second half shell 38, in particular also by gluing in the area of the contact surfaces, preferably takes place in the same step. The second half shell 38 also has a main girder 40, which extends in the longitudinal direction along the interior of the first half shell 10.

The FIGS. 2a) and 2b) show a sectional representation of the side view of the shear web setting device according to the invention equivalent to the representations in FIGS. 1c) and 1d). In FIG. 2a), the shear web setting device 26 with the shear webs 32 fastened to it are located in a defined position, wherein a relatively large distance remains between the shear webs 32 and the first half shell 10. Starting from this position, the lowering of the shear web setting device 26 takes place by opening a valve of the hydraulic cylinder 20. The shear web setting device 26 with the shear webs 32 fastened to it moves towards the first half shell 10, due to the guide formed by the lowering devices 18 following a permanently specified movement direction, in the shown example vertically downwards, and adhering to a defined angular position.

The movement takes place until an end position defined by at least one stop is reached, which is shown in FIG. 2b). In this position, the shear webs 32 are located in a position defined with respect to the separation plane 14. It is easy to see here that the shear web does not rest on the first half shell, but rather is positioned at a distance h from the first half shell 10.

The FIGS. 3a) and 3b) show a cross-section through a rotor blade with incorrectly installed shear webs 32, wherein the method according to the invention was not used for assembling the shear webs 32. In FIG. 3a), the shear webs 32 have sunken into the applied adhesive due to a low viscosity of the adhesive under their own weight until they rest on the main girder 16 of the first half shell 10. In these contact areas, the adhesive is almost completely displaced and sufficient material connection is not established between shear web 32 and main girder 16. The height difference created between the shear webs 32 and the main girder 40 of the second half shell 38 is counterbalanced by an overdimensioned glue application 24 between the shear webs 32 and the second half shell 38.

The FIG. 3b) shows a cut through a rotor blade, in which the main girder 16 of the first blade half shell 10 has a wave 17 on one side. Through this wave 17, the punctiformly resting shear web 32.1 tips in the longitudinal direction and obtains a higher position with respect to the separation plane 14. The second shear web 32.2 was fitted in a belt area with a normal cross-section but has sunk down to the main girder 16. The fastening sections 36.1, 36.2 of the shear webs 32.1, 32.2 thereby have a different distance from the separation plane 14. The second half shell 38 is pulled down during the fitting to the first half shell 10 by means of a mold closing device (not shown), whereby the adhesive applied to the fastening section 36.1 of the first shear web is displaced. In the area of the fastening section 36.2 of the second shear web 32.2, the vertical distance between the fastening section and the main girder is so large that it cannot be bridged by the available adhesive 24. In this example, there is no material connection between the shear webs and the main girders 16 at the collection point to the first and on both connection points to the second half shell 38.

FIG. 3c) shows a cross-section through a rotor blade with shear webs 32 installed according to the method/apparatus according to the invention. The shear webs 32 are located in an exactly defined position with respect to the separation plane 14 and thus at a distance from the first and second half shell 10, 38. This allows the even and accurate dimensioning of the glued connections 24 and guarantees a material connection at all connection points.

The above disclosure is intended to be illustrative and not exhaustive. This description will suggest many variations and alternatives to one of ordinary skill in this art. All these alternatives and variations are intended to be included within the scope of the claims where the term "comprising" means "including, but not limited to". Those familiar with the art may recognize other equivalents to the specific embodiments described herein which equivalents are also intended to be encompassed by the claims.

Further, the particular features presented in the dependent claims can be combined with each other in other manners within the scope of the invention such that the invention should be recognized as also specifically directed to other embodiments having any other possible combination of the features of the dependent claims. For instance, for purposes of claim publication, any dependent claim which follows should be taken as alternatively written in a multiple dependent form from all prior claims which possess all antecedents referenced in such dependent claim if such multiple dependent format is an accepted format within the jurisdiction (e.g. each claim depending directly from claim 1 should be alternatively taken as depending from all previous claims). In jurisdictions where multiple dependent claim formats are restricted, the following dependent claims should each be also taken as alternatively written in each singly dependent claim format which creates a dependency from a prior antecedent-possessing claim other than the specific claim listed in such dependent claim below.

This completes the description of the preferred and alternate embodiments of the invention. Those skilled in the art may recognize other equivalents to the specific embodiment described herein which equivalents are intended to be encompassed by the claims attached hereto.

What is claimed is:

1. A method for assembling a rotor blade for a wind turbine, wherein the rotor blade has a first half shell (10), a second half shell (38), a leading edge, a trailing edge, a separation plane (14) running from the leading edge to the trailing edge and at least one shear web (32) running in a longitudinal direction of the rotor blade, comprising the following steps:
    arranging the first half shell (10) in a specified position,
    fastening the at least one shear web (32) on a shear web setting device (26),
    applying adhesive (24) in the connection area between the first half shell (10) and the at least one shear web (32),
    moving the shear web setting device (26) with the at least one shear web (32) fastened to it in the direction to the first half shell (10) to an end position, in which the adhesive (24) cures and interconnects the at least one shear web (32) and the first half shell (10), wherein at least one movement restriction device restricting the movement towards the first half shell (10) defines the end position with respect to the separation plane (14) such that the at least one shear web (32), instead of resting on the first half shell (10), is arranged floating along its entire length at a distance from the first half shell (10), and further wherein the at least one movement restriction device is designed as a stop on the shear web setting device (26) and works together with the shell edge of the first half shell (10) and/or with a reception device for the first half shell (10) holding the first half shell (10) in its determined position,
    loosening and removing the shear web setting device (26) from the at least one shear web (32),
    applying adhesive in the connection area between the second half shell (38) and the at least one shear web (32), and
    arranging the second half shell (38) in a specified position and connecting the first half shell (10) with the second half shell (38).

2. The method of claim 1, wherein the shear web setting device with the at least one shear web (32) fastened to it is arranged in a defined position at a distance from the first half shell before the movement to the end position and the movement of the shear web setting device is directed such that the movement direction and the relative angular position of the at least one shear web (32) is defined with respect to the first half shell (10).

3. The method of claim 1, wherein for assembling a rotor blade, which has several shear webs (32) running in the longitudinal direction, all shear webs (32) are fastened on the shear web setting device (26), wherein the position of each shear web (32) with respect to the shear web setting device (26) and with respect to the other shear webs (23) is permanently defined by the fastening.

4. The method of claim 1, wherein the fastening of the at least one shear web (32) on the shear web setting device (26) takes place with a plurality of load-bearing means on the shear web setting device (26), which work together with load-bearing points on the at least one shear web (32) such that a specified positioning of the at least one shear web (32) with respect to the shear web setting device (26) is achieved.

5. A method for assembling a rotor blade for a wind turbine, wherein the rotor blade has a first half shell (10), a second half shell (38), a leading edge, a trailing edge, a separation plane (14) running from the leading edge to the trailing edge and at least one shear web (32) running in a longitudinal direction of the rotor blade, comprising the following steps:
    arranging the first half shell (10) in a specified position,
    fastening the at least one shear web (32) on a shear web setting device (26),
    applying adhesive (24) in the connection area between the first half shell (10) and the at least one shear web (32),
    moving the shear web setting device (26) with the at least one shear web (32) fastened to it in the direction to the first half shell (10) to an end position, in which the adhesive (24) cures and interconnects the at least one shear web (32) and the first half shell (10), wherein at least one movement restriction device restricting the movement towards the first half shell (10) defines the end position with respect to the separation plane (14) such that the at least one shear web (32), instead of resting on the first half shell (10), is arranged floating along its entire length at a distance from the first half shell (10),
    loosening and removing the shear web setting device (26) from the at least one shear web (32),
    applying adhesive in the connection area between the second half shell (38) and the at least one shear web (32), and
    arranging the second half shell (38) in a specified position and connecting the first half shell (10) with the second half shell (38),
    further wherein the fastening of the at least one shear web (32) on the shear web setting device (26) takes place with a plurality of load-bearing means on the shear web setting device (26), which work together with load-bearing points on the at least one shear web (32) such that a specified positioning of the at least one shear web (32) with respect to the shear web setting device (26) is achieved, and wherein the load-bearing means each have a cone, which works together with a conical opening on one of the load-bearing points or vice versa.

6. The method of claim 1, wherein the movement of the shear web setting device (26) with the at least one shear web (32) fastened to it in the direction of the first half shell (10) takes place by means of lowering devices (18), which lower the shear web setting device (26) relative to the first half shell (10).

7. The method of claim 6, wherein the at least one movement restriction device is a controller for restricting the movement of the lowering devices (18).

8. The method of claim 6, wherein the lowering devices (18) form bearings, onto which the shear web setting device (26) is settled down before the shear web setting device (26) is lowered with the help of the lowering devices (18).

9. A method for assembling a rotor blade for a wind turbine, comprising the following steps:
providing the rotor blade with a first half shell (10), a second half shell (38), a leading edge, a trailing edge, a separation plane (14) running from the leading edge to the trailing edge and at least one shear web (32) running in the longitudinal direction of the rotor blade arranging the first half shell (10) in a specified position;

fastening the at least one shear web (32) on a shear web setting device (26);

applying adhesive (24) in a connection area between the first half shell (10) and the at least one shear web (32);

moving the shear web setting device (26) with the at least one shear web (32) fastened to it in the direction to the first half shell (10) to an end position, in which the adhesive (24) cures and interconnects the at least one shear web (32) and the first half shell (10), wherein at least one movement restriction device restricting the movement towards the first half shell (10) defines the end position with respect to the separation plane (14) such that the at least one shear web (32), instead of resting on the first half shell (10), is arranged floating along its entire length at a distance from the first half shell (10);

loosening and removing the shear web setting device (26) from the at least one shear web (32);

applying adhesive in a connection area between the second half shell (38) and the at least one shear web (32);

arranging the second half shell (38) in a specified position and connecting the first half shell (10) with the second half shell (38);

wherein the shear web setting device with the at least one shear web (32) fastened to it is arranged in a defined position at a distance from the first half shell before the movement to the end position and the movement of the shear web setting device is directed such that the movement direction and the relative angular position of the at least one shear web (32) is defined with respect to the first half shell (10);

further wherein the movement of the shear web setting device (26) with the at least one shear web (32) fastened to it in the direction of the first half shell (10) takes place by means of lowering devices (18), which lower the shear web setting device (26) relative to the first half shell (10), and further wherein the at least one movement restriction device is a controller for restricting the movement of the lowering devices (18), and further wherein the at least one movement restriction device is designed as a stop on the shear web setting device (26) and works together with the shell edge of the first half shell (10) and/or with a reception device for the first half shell (10) holding the first half shell (10) in its determined position.

\* \* \* \* \*